US008936189B2

(12) United States Patent
Chuang

(10) Patent No.: US 8,936,189 B2
(45) Date of Patent: Jan. 20, 2015

(54) SWITCHABLE HOLE PUNCH APPARATUS

(75) Inventor: Chih-Wei Chuang, Somerset, NJ (US)

(73) Assignee: Officemate International Corporation, Edison, NJ (US)

( * ) Notice: Subject to any disclaimer, the term of this patent is extended or adjusted under 35 U.S.C. 154(b) by 220 days.

(21) Appl. No.: 13/553,988

(22) Filed: Jul. 20, 2012

(65) Prior Publication Data

US 2014/0020541 A1 Jan. 23, 2014

(51) Int. Cl.
*G06K 1/06* (2006.01)

(52) U.S. Cl.
USPC .............................................. 234/51; 234/109

(58) Field of Classification Search
USPC .................................... 234/51, 109, 120, 131
See application file for complete search history.

(56) References Cited

U.S. PATENT DOCUMENTS

| | | | | |
|---|---|---|---|---|
| 1,995,887 | A | 3/1935 | Kimball | |
| D169,080 | S | 3/1953 | Marano | |
| 3,392,913 | A | 7/1968 | Nielsen | |
| 4,724,734 | A | 2/1988 | Hse | |
| 5,588,344 | A * | 12/1996 | Chun | 83/13 |
| 5,611,254 | A | 3/1997 | Rall | |
| 5,628,502 | A | 5/1997 | Amarakoon | |
| 5,778,750 | A | 7/1998 | Drzewiecki et al. | |
| 5,787,783 | A | 8/1998 | Evans et al. | |
| 5,797,308 | A | 8/1998 | Evans et al. | |
| 5,829,334 | A | 11/1998 | Evans et al. | |
| D414,091 | S | 9/1999 | Rellinger | |
| 6,032,566 | A | 3/2000 | Evans et al. | |
| 6,065,379 | A | 5/2000 | Shinno et al. | |
| D434,443 | S | 11/2000 | Mori et al. | |
| 6,269,721 | B1 * | 8/2001 | Tseng | 83/618 |
| 6,295,908 | B1 | 10/2001 | Holzhauser et al. | |
| 6,439,093 | B1 | 8/2002 | Davies | |
| 6,644,161 | B2 | 11/2003 | Lin | |
| 6,688,199 | B2 | 2/2004 | Godston et al. | |
| 6,786,395 | B1 | 9/2004 | Lin | |
| 6,869,010 | B2 | 3/2005 | Morson | |
| 6,955,109 | B1 * | 10/2005 | Huang | 83/549 |
| 6,978,925 | B2 | 12/2005 | Morson | |
| 6,983,877 | B2 * | 1/2006 | Ko | 234/102 |
| 7,032,812 | B2 | 4/2006 | Ostini | |
| 7,073,706 | B2 | 7/2006 | Yaginuma et al. | |
| 7,111,540 | B2 | 9/2006 | Rodriquez | |
| 7,255,032 | B2 | 8/2007 | Ho | |
| D564,593 | S | 3/2008 | Kent et al. | |
| D564,594 | S | 3/2008 | Kent et al. | |
| 7,458,505 | B2 | 12/2008 | Majima et al. | |
| D588,647 | S | 3/2009 | Luo et al. | |
| D592,250 | S | 5/2009 | Cunningham et al. | |
| 7,610,838 | B2 | 11/2009 | Kent et al. | |

(Continued)

*Primary Examiner* — Sean Michalski
(74) *Attorney, Agent, or Firm* — Lerner, David, Littenberg, Krumholz & Mentlik, LLP

(57) ABSTRACT

An apparatus for punching holes is provided. The apparatus may include a base movable from a first position to a second position and first and second punch assemblies attached to and movable with the base. The punch assemblies may each include parallel punches movable relative to the base and having an end. The apparatus may include first and second cams fixed to a rotatable shaft and having an engagement portion for engagement with the ends of the respective punches at a predetermined rotation position of the shaft. When the base is in the first position, rotation of the shaft to the predetermined rotation position may cause movement of only one of the punches relative to the base. When the base is in the second position, rotation of the shaft to the predetermined rotation position may cause movement of only the other punch of the punch assemblies.

17 Claims, 6 Drawing Sheets

(56) References Cited

U.S. PATENT DOCUMENTS

| | | | | |
|---|---|---|---|---|
| 7,654,183 | B2 | 2/2010 | Marks | |
| 7,721,635 | B2 | 5/2010 | Luo et al. | |
| 7,721,636 | B2 | 5/2010 | Liu | |
| 8,122,805 | B2 * | 2/2012 | Liu | 83/687 |
| 8,651,004 | B2 | 2/2014 | Liu et al. | |
| 2002/0000149 | A1 | 1/2002 | Miura et al. | |
| 2002/0139232 | A1 * | 10/2002 | Hsu | 83/549 |
| 2002/0157517 | A1 | 10/2002 | Huang | |
| 2004/0069110 | A1 | 4/2004 | Godston et al. | |
| 2005/0022644 | A1 * | 2/2005 | Morson | 83/55 |
| 2005/0132859 | A1 | 6/2005 | Hunag | |
| 2005/0172775 | A1 | 8/2005 | Lee | |
| 2006/0150790 | A1 | 7/2006 | Ko | |
| 2007/0266836 | A1 | 11/2007 | Marks | |
| 2008/0236353 | A1 | 10/2008 | Kent et al. | |

* cited by examiner

SWITCHABLE HOLE PUNCH APPARATUS

BACKGROUND OF THE INVENTION

The present invention relates to a hole punching apparatus, and more particularly to a hole punch that automatically punches two or three holes in response to a user's selection.

Standard letter sized and legal sized papers used in businesses and homes throughout the world are often punched with two or three holes at predetermined locations along their edges in order to be placed into binders, folders, and other paper storage mediums having holes at locations corresponding to the holes of the papers. Conventionally, three holes may be punched along the longer edge of letter sized paper or two holes may be punched along the shorter edge of letter or legal sized paper.

Many hole-punching devices in use today are manual devices that can punch one or a plurality of holes through a single sheet or a sheaf of papers using a force that a user exerts on a lever, which in turn causes punch rods to pierce the paper at predetermined locations. To accommodate for differences in the desired number of holes, these manual devices require manual reconfiguration of the punches by a user, such as by unlocking the punches, then sliding the punches along a rail, and finally relocking the punches.

Some hole-punching devices incorporate an electric motor that may be activated by a selector switch. In such devices, the electric motor typically drives a rotational motion to a driveshaft and cams located therealong that interface with a cam surface on the punch rods, i.e., cam followers, thus providing leverage to the punch rods to pierce paper inserted into a guide of the punch.

Some more advanced electric hole-punching devices have also included switching mechanisms for punching different numbers of holes through the use of a selector. Such devices are described in U.S. Pat. No. 6,065,379 to Shinno et al. and U.S. Pat. No. 6,983,877 to Ko et al., the entire disclosures of which are hereby incorporated by reference herein. In these punching devices, the switching mechanisms typically include cams that are shifted from one position to another to change between a mode for punching two holes and a mode for punching three holes into paper inserted into these punching devices.

There exists a need, however, for providing simple switching between modes for punching different numbers of holes in sheets of paper.

BRIEF SUMMARY OF THE INVENTION

In one aspect of the invention, an apparatus for punching holes may include a base movable from a first position to a second position. The apparatus may further include first and second punch assemblies attached to the base so as to move together with the base. Each of the first and second punch assemblies may include a punch movable relative to the base and having an end. The respective punches may be parallel. The apparatus may further include first and second cams fixed to a rotatable shaft. Each of the first and second cams may have an engagement portion for engagement with the ends of the respective first and second punches at a predetermined rotation position of the rotatable shaft. When the base is in the first position, rotation of the rotatable shaft to the predetermined rotation position may cause movement of only one punch of the first and second punch assemblies relative to the base. When the base is in the second position, rotation of the rotatable shaft to the predetermined rotation position may cause movement of only the other punch of the first and second punch assemblies.

In another aspect of the invention, an apparatus for punching holes may include a base movable from a first position to a second position. The apparatus may further include a punch attached to the base so as to move together with the base. The punch may be further movable relative to the base and have an end. The punch may further include first and second cams fixed to a rotatable shaft. Each of the first and second cams may have an engagement portion for engagement with the end of the punch at a predetermined rotation position of the rotatable shaft. When the base is in the first position, rotation of the rotatable shaft to the predetermined rotation position may cause the engagement portion of only one cam of the first and second cams to engage with the end of the punch so as to move the punch relative to the base. When the base is in the second position, rotation of the rotatable shaft to the predetermined rotation position may cause the engagement portion of only the other of the first and second cams to engage with the end of the punch so as to move the punch relative to the base.

BRIEF DESCRIPTION OF THE DRAWINGS

These and other features, aspects, and advantages of the present invention will become better understood with regard to the following description, appended claims and accompanying drawings where:

DETAILED DESCRIPTION

Figure 1:
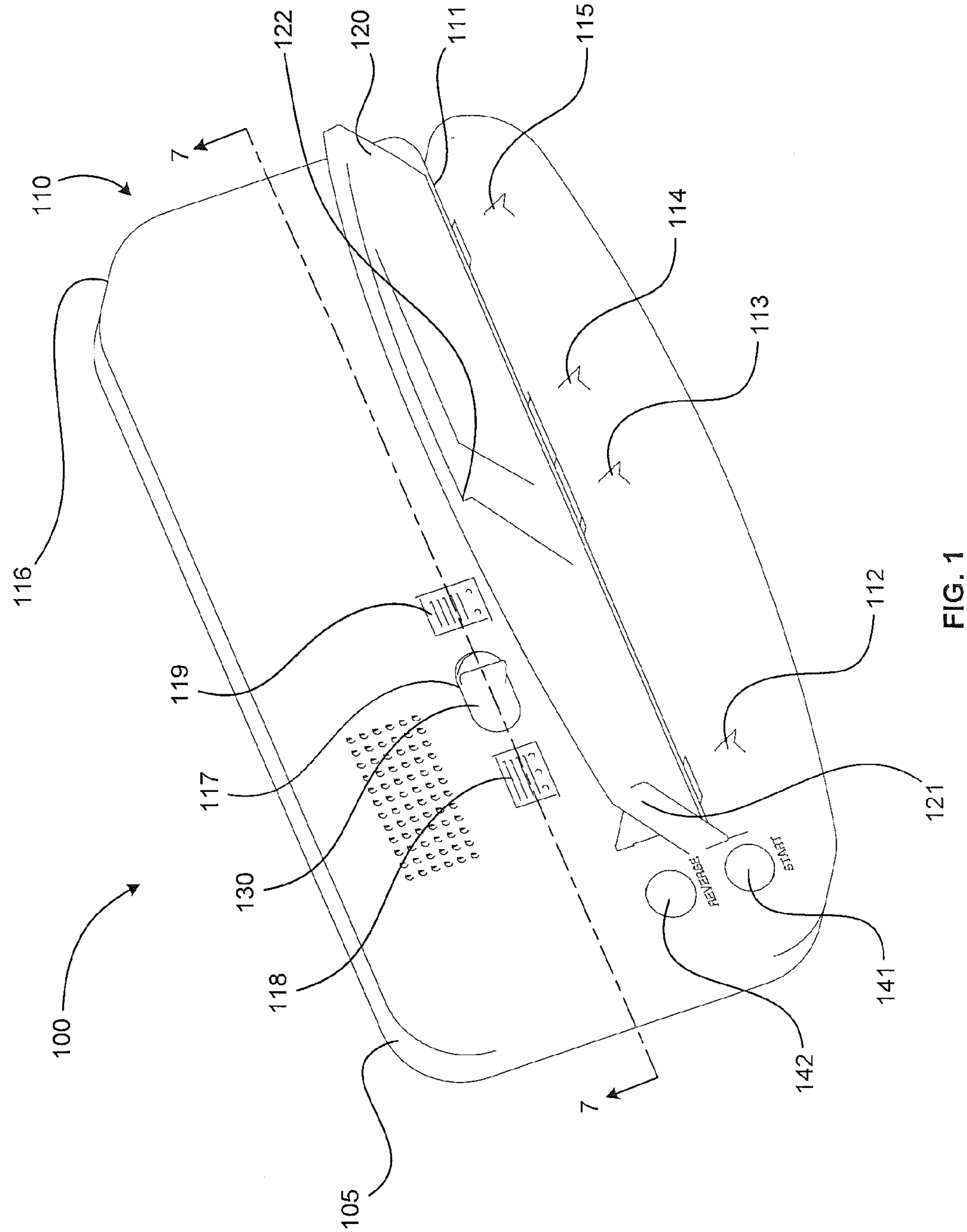
FIG. 1 is a perspective view of a hole punch in accordance with an embodiment of the invention, shown in a two-hole configuration.

Referring to FIG. 1, a hole punch 100 may include a lower cover 105 attached to an upper cover 110. The upper cover 110 may be attached to the lower cover 105 through the use of fasteners, through a snap-fit, or through other known means of assembling components in order to protect, and in some embodiments, enclose components of the hole punch, such as the components described further herein. The lower and upper covers 105, 110 may be made of a variety of materials such as, but not limited to, metals or plastics that act to prevent the entry of dust therein.

The upper cover 110 may include a slot 111 for receiving a sheaf of paper. The upper cover 110 may further include designation markings 112-115 that may be used to identify a location where holes may be punched into a sheaf of paper inserted into the hole punch 100. A guide 120 may extend, by way of a snap-fit or other known means of attachment, from the upper cover 110 at a location adjacent to and along the slot 111. The flat or planar portion of sheets of paper inserted into the slot 111 may rest against the guide 120 during a punching operation, i.e., an operation that causes holes to be punched in a sheet or a sheaf of paper, performed by the hole punch 100.

The slot 111 may extend in a longitudinal direction along the upper cover 110. The slot 111 may be open on an end 116 of the upper cover 110 to allow a sheaf of paper to be punched to extend beyond the end 116 during the punching operation. The guide 120 may have a first notch 121 at an end of the guide furthest from the end 116 and a second notch 121 along a central portion of the guide 120 in which the first and second notches 121, 122 may form an abutment for edges of sheets of paper inserted into the punch 100. For example, in the arrangement shown in FIG. 1, the longitudinal edge of a sheet of standard 8.5 inch by 11 inch sized paper may be inserted into the slot 111 with a shorter edge of the sheet of paper rested against the notch 121. In the same arrangement shown in FIG. 1, a shorter edge of the same sheet of paper may be inserted into the punch 100 with a longitudinal edge of the sheet rested against the notch 122 and an opposing longitudinal edge of the sheet extending beyond the end 116.

The upper cover 110 may further include a selector slot 117 that is sized to permit a protrusion 131 of a selector 130 to extend therethrough and to slide therewithin. Labels 118, 119 designating a three-hole punch configuration and a two-hole punch configuration, respectively, of the punch 100 may be placed adjacent the slot 117 on opposite ends of the slot to indicate that the punch can operate in a mode that is accordance with one of these punch configurations.

Figure 2:
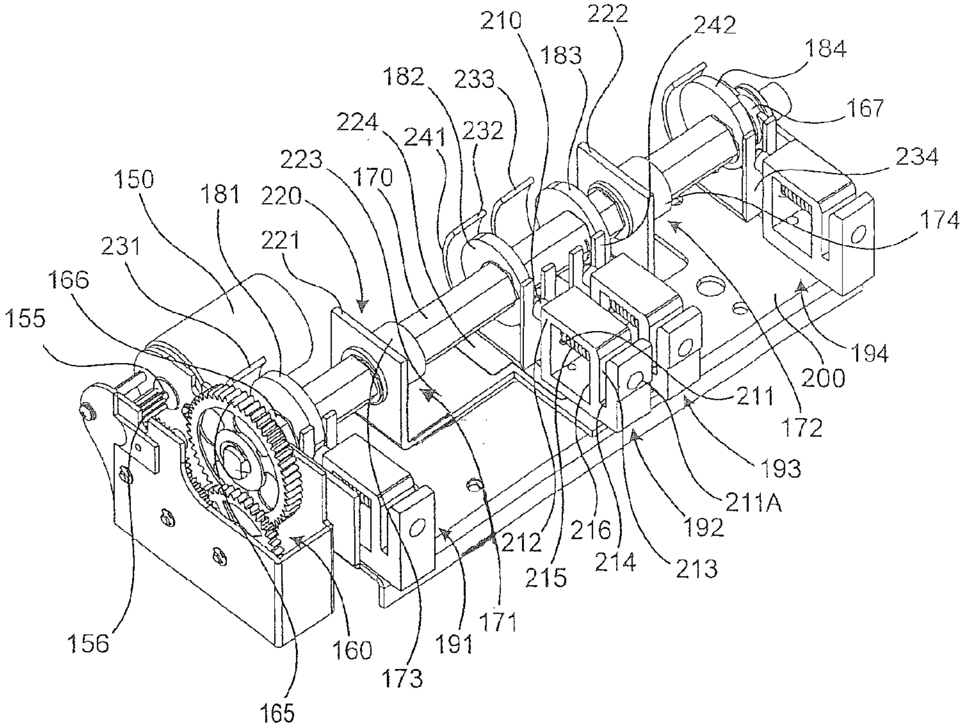
FIG. 2 is a perspective view of the hole punch of FIG. 1, shown in a three-hole configuration and with a cover removed.
Figure 3:
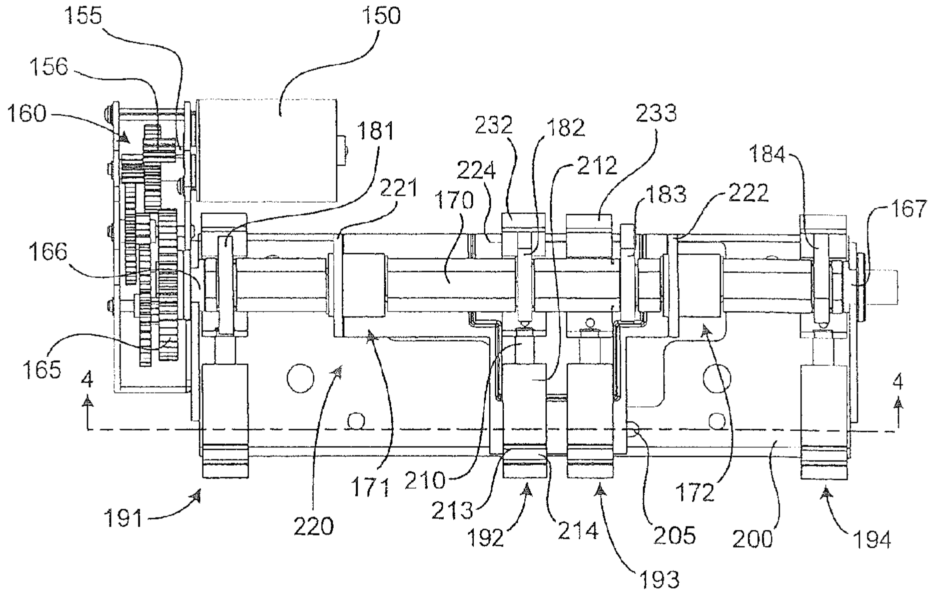
FIG. 3 is a plan view of the hole punch of FIG. 1, shown in the three-hole configuration and with the cover removed.

Still referring to FIG. 1, a start button 141 may be accessible through a hole in the upper cover 110. The start button 141 may be depressed to initiate the punching operation of the punch 100. Now referring to FIGS. 2 and 3 showing components at least partially covered by the upper cover 110, the hole punch 100 may be an electrically powered punch in which depression of the start button 141 electrically connects a circuit of a motor 150 with an electrical power supply (not shown). The power supply may be a power supply that receives alternating current (AC) electrical power, such as from a standard electrical power outlet found in most residential and commercial buildings, or direct current (DC) electrical power, such as from a DC battery, and supplies electrical power to the motor 150. The motor 150 may be an AC motor or a DC motor (used in conjunction with a DC-to-AC converter) well-known to those of ordinary skill in the art. In some arrangements, release of the start button 141 may cause disconnection of the circuit of the motor from the power supply. In one embodiment, a capacitor may be connected to the circuit to maintain a supply current to the motor 150.

The motor 150 may have an output shaft 155 having a gear set 156 for meshing with a system of gears 160. In this manner, when powered, the motor 150 may provide a torque to the gear system 160 ultimately driving a main gear 165 coupled by an axle 166 to a shaft 170 having a length and a cross-section, such that the main gear 165, the axle 166, and the shaft 170 rotate in a predetermined direction, i.e., in a clockwise or counterclockwise direction. As shown in the arrangement of FIG. 2, the main gear 165, the axle 166, and the shaft 170 may be concentric about an imaginary central longitudinal axis through the shaft 170 such that an angular displacement of the main gear 165 causes an equal angular displacement of the axle 166 and the shaft 170.

The hole punch 100 further may include four cams 181-184 coupled to and spaced along the shaft 170. As shown in the arrangement of FIG. 2, the shaft 170 may have a hexagonal cross-section that substantially conforms to a hexagonally-shaped bore through the cams 181-184 such that an angular displacement of the shaft causes a substantially equal angular displacement of the cams. Moreover, the cams 181-184 may be fixed to the shaft 170 at their respective positions such that the cams 181-184 do not translate along the length of the shaft 170. In addition, the hole punch 100 may include punch assemblies 191-194 correspond to each of the cams 181-184. The cams 181-184 may have two surfaces separated by a thickness. The cams 181-184 may further have an eccentricity and may still further have an oval shape having opposing eccentricities, as in the arrangement best shown in FIG. 2, in which the eccentricity provides a circumferential surface for contacting a cam follower, as discussed further herein.

As illustrated with respect to the punch assembly 192, each of the punch assemblies 191-194 may include a punch rod 210 received within and movable through an axial bore 211 of a punch die 212. Each of the punch assemblies 191-194 may further have a die slot 213 having a width for receiving a predetermined quantity of paper. An end of the die slot 213 may include a seat 214 upon which paper inserted into the die slot 213 rests. The bore 211 may extend through the punch die 212 and a second bore 211A, coaxial to the bore 211, may extend through an end flange portion 209 of the punch die 212 that faces the die slot 213, to permit the punch rod 210 to translate through an entire thickness of the punch die 212 in a direction parallel to the longitudinal axis of the punch rod. Each of the punch dies 212 may include walls forming an enclosure around at least a portion of the punch rod 210 such that a resilient element 215 may be placed between a retainer (not shown) of the punch rod 211 and a wall 216 of the enclosure. In this manner, the resilient element 215 may bias the punch rod 210 in a position in which no portion of the punch rod 210 may be in the die slot 213, a portion of the punch rod extends beyond the punch die 212 towards the shaft 170, and the punch rod is in vertical alignment with the eccentricity of a corresponding one of the cams 181-184. As in the arrangement shown in FIG. 2, the resilient element 215 may be a compression spring that coils around the punch rod 210. Moreover, in some embodiments, the punch rod 210 may be in vertical alignment with the eccentricity of the corresponding one of the cams 181-184 when the cam is oriented with its longitudinal axis parallel to the punch rod.

Outer punch assemblies 191, 194 may be fixed to a mount 200 on opposite ends of the mount such that the punch dies 212 of the assemblies 191, 194 do not move relative to the mount. The inner punch assemblies 192, 193 may be fixed to a movable plate 220. The plate 220 may be coupled to the shaft 170. For example, as further shown in FIGS. 2 and 3, the plate 220 may have flanges 221, 222 extending in a vertical direction from a body 223. Each of the flanges 221, 222 may be positioned and may have a bore such that the flanges surround corresponding sliding elements 171, 172 that are fixed to the shaft 170 at positions along the shaft outside inner cams 182, 183. The outer diameter of the sliding elements 171, 172 may be substantially the same as the inner diameter of the bores of the flanges 221, 222 such that the flanges may slide in directions parallel to the longitudinal axis of the shaft 170 along respective outer surfaces 173, 174 of the sliding elements 171, 172 with limited free play. Due to the fixture of the inner punch assemblies 192, 193 to the plate 220, sliding of the flanges 221, 222 along the outer surfaces 173, 174 of the sliding elements 171, 172 permits the inner punch assemblies to translate the same distance that the flanges may travel along the sliding elements.

Harnesses 231-234 may be provided corresponding to each of the punch assemblies 191-194. Outer harnesses 231, 234 may be fixed to the mount 200. Inner harnesses 232, 233 may be fixed to the plate 220, such as by a fastener, to permit the inner harnesses to move, in conjunction with the movement of the plate, along with the inner punch assemblies 192, 193 in directions parallel to the longitudinal axis of the shaft 170. As in the arrangement shown in FIGS. 2 and 3, the inner harnesses 232, 233 may be fixed to a recess 224 of the plate 220 set at a height below the body 223 of the plate to adjust the position of the inner harnesses 232,233 relative to the punch rod 210. Each of the harnesses 231-234 has an engagement portion 241 and a slot portion 242 for guiding the punch rod 210 therethrough. The engagement portion 241 is positioned a distance from a corresponding one of the cams 181-184 such that during rotation of the shaft 170, the eccentricity on one end of the cam may contact the corresponding harness 231-234.

In this regard, at a predetermined angular displacement, the eccentric portion of any of the cams 181-184 may contact the punch rod 210 of the respective punch assembly 191-194 to drive the punch rod linearly as the cam rotates through a maximum radius of the eccentric portion such that the punch rod protrudes into the die slot 213. In a preferred arrangement, the punch rod 210 may protrude completely across the width of the die slot 213 such that a hole is punched within any sheet of paper within the die slot when the punch rod is at maximum extension across the die slot. As any of the cams 181-184 rotates beyond the most eccentric portion, i.e., the portion with the maximum radius from a center of the cam, the restoring force of the resilient element 215 may cause the punch rod 210 to retract from the die slot 213. However, if the resilient element 215 does not cause the punch rod 210 to retract, any of the cams 181-184, as the cam continues its angular rotation, will contact the engagement portion 241 of the corresponding harness 231-234 to force the punch rod 210 to retract from the die slot 213.

Figure 4:
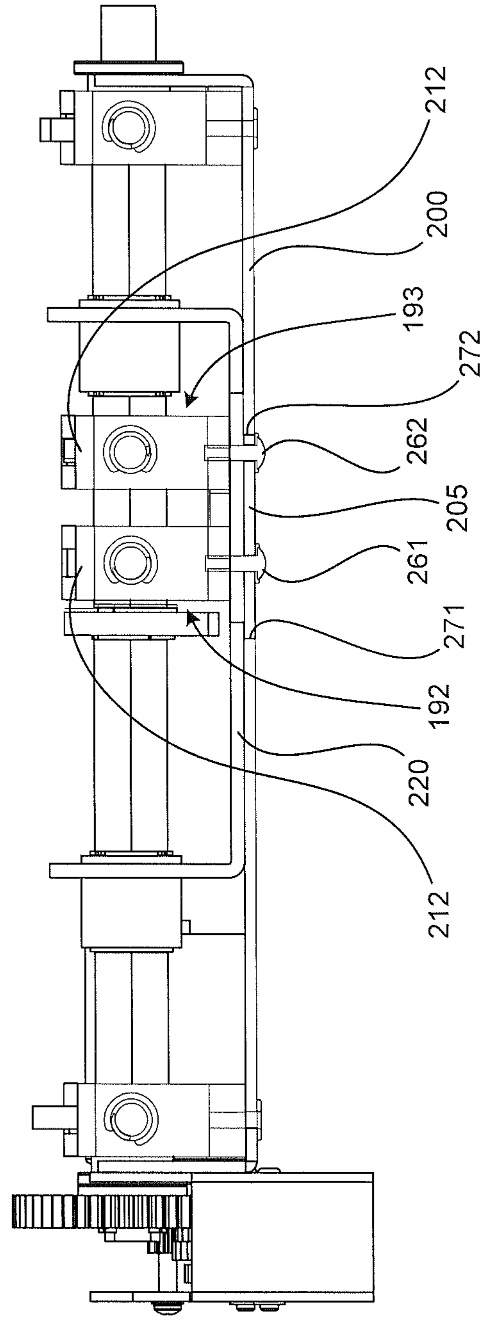
FIG. 4 is a side cross-sectional view along line 4-4 as shown in FIG. 3.

Referring now to FIG. 4, in some embodiments, the inner punch assemblies 192, 193 may be fixed to the respective mount 200 or the plate 220 by any known means of fixation, such as by the respective fasteners 261, 262. The fasteners 261, 262 may be screws that are threaded through the plate 220 and the punch dies 212 of each of the punch assemblies 192, 193. In the arrangement shown, a portion of each of the fasteners 261, 262 may protrude from the plate 220 through a key slot 205. A head on the fasteners 261, 262 may be wider than the width of the key slot 205 to prevent the fasteners and thus the plate 220 and punch assemblies 192, 193 from being dislodged from the mount 200. In this manner, the plate 220 may slide relative to the mount 200 along the slot 205. Moreover, fasteners 261, 262 may contact ends 271, 272 of the key slot 205 that may act as stops for the sliding movement of the plate 220.

Referring again to FIGS. 2 and 3, by sliding the plate 220 toward the gear system 160, the longitudinal axis of the punch rod 210 of the inner punch assembly 192 may be aligned with the circumferential surface of the oval cam 182 while the longitudinal axis of the punch rod 210 of the inner punch assembly 193 is not aligned with the circumferential surface of the oval cam 183. In this configuration, designated hereinafter a "three-hole punch configuration," when the motor is energized, the punch rods 210 of the outer punch assemblies 191, 194 may be moved by the respective cams 181, 184, and the inner punch assembly 192 may be moved by the respective cam 182. The punch rod 210 of the assembly 193, which is not aligned with the cam 183, is not moved in the three-hole punch configuration. Moreover, in such a configuration, the distances between the punch rod 210 of the outer punch assembly 191 and the punch rod of the inner punch assembly 192 and between the punch rod of the outer punch assembly 194 and the punch rod of the inner punch assembly 192 may be the same distances between the outer holes and the inner hole of a sheet for insertion in a standard 3-ring binder. In this manner, the punch 100 may be used to produce sheets having 3 holes that are configured for insertion into a standard 3-ring binder such as those used in most commercial businesses.

Figure 5:
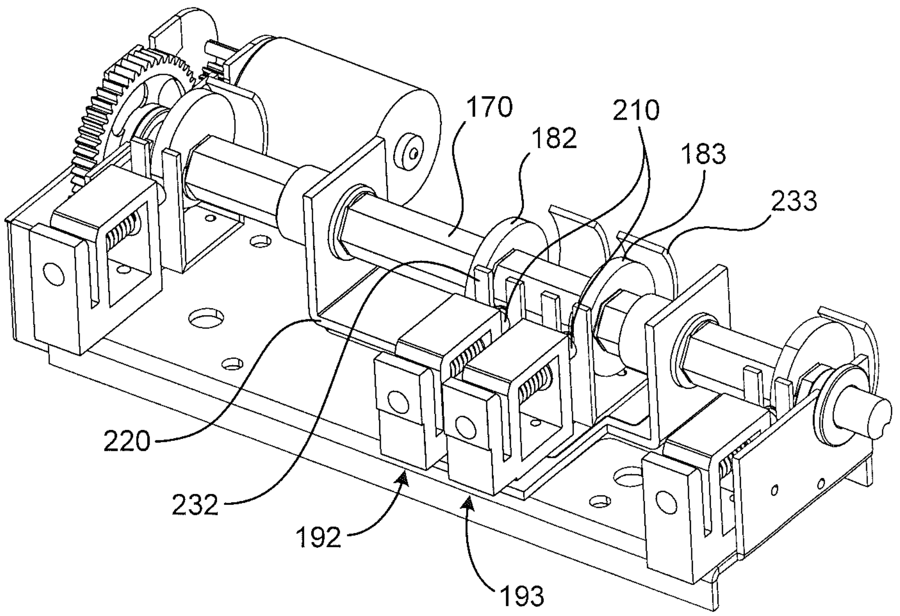
FIG. 5 is a perspective view of the hole punch of FIG. 1, shown in a two-hole configuration and with the cover removed.
Figure 6:
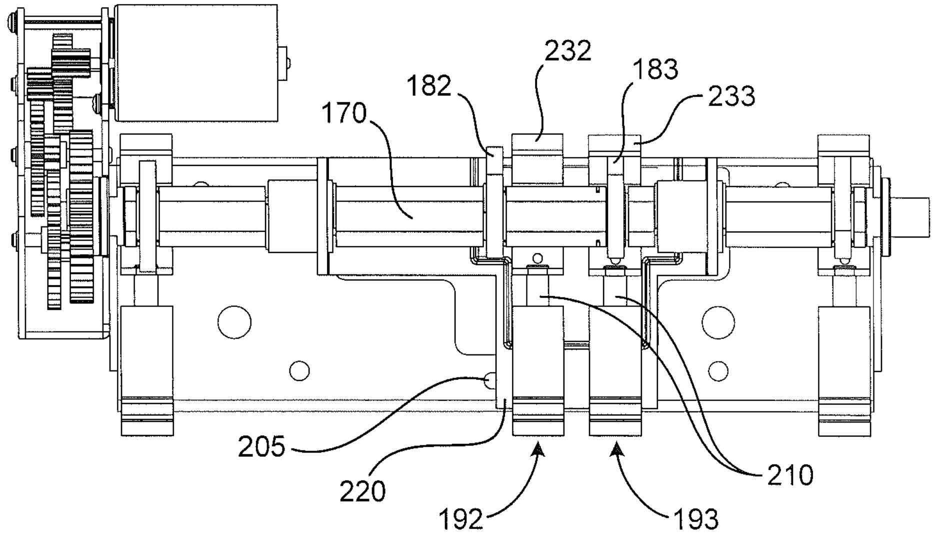
FIG. 6 is a plan view of the hole punch of FIG. 1, shown in the two-hole configuration and with the cover removed.

Alternatively, as illustrated in FIGS. 5 and 6, by sliding the plate 220 in a direction away from the gear system 160, the longitudinal axis of the punch rod 210 of the inner punch assembly 193 may be aligned with the circumferential surface of the oval cam 183 while the longitudinal axis of the punch rod 210 of the inner punch assembly 192 is not aligned with the circumferential surface of the oval cam 182. In this configuration, designated hereinafter a "two-hole punch configuration," when the motor is energized, the inner punch assembly 193 may be moved by the respective cam 182 while the punch rods 210 of the outer punch assemblies 191, 194 are moved by the respective cams 181, 184 The punch rod 210 of the assembly 192, which is not aligned with the cam 182, is not moved in the two-hole punch configuration. In this arrangement, the distance between the punch rod 210 of the inner punch assembly 193 and the punch rod of the outer punch assembly 194 may be the same distance between the holes of paper punched for insertion in a standard 2-ring binder or prong fastener, such as is known to be used for legal services.

Figure 7:
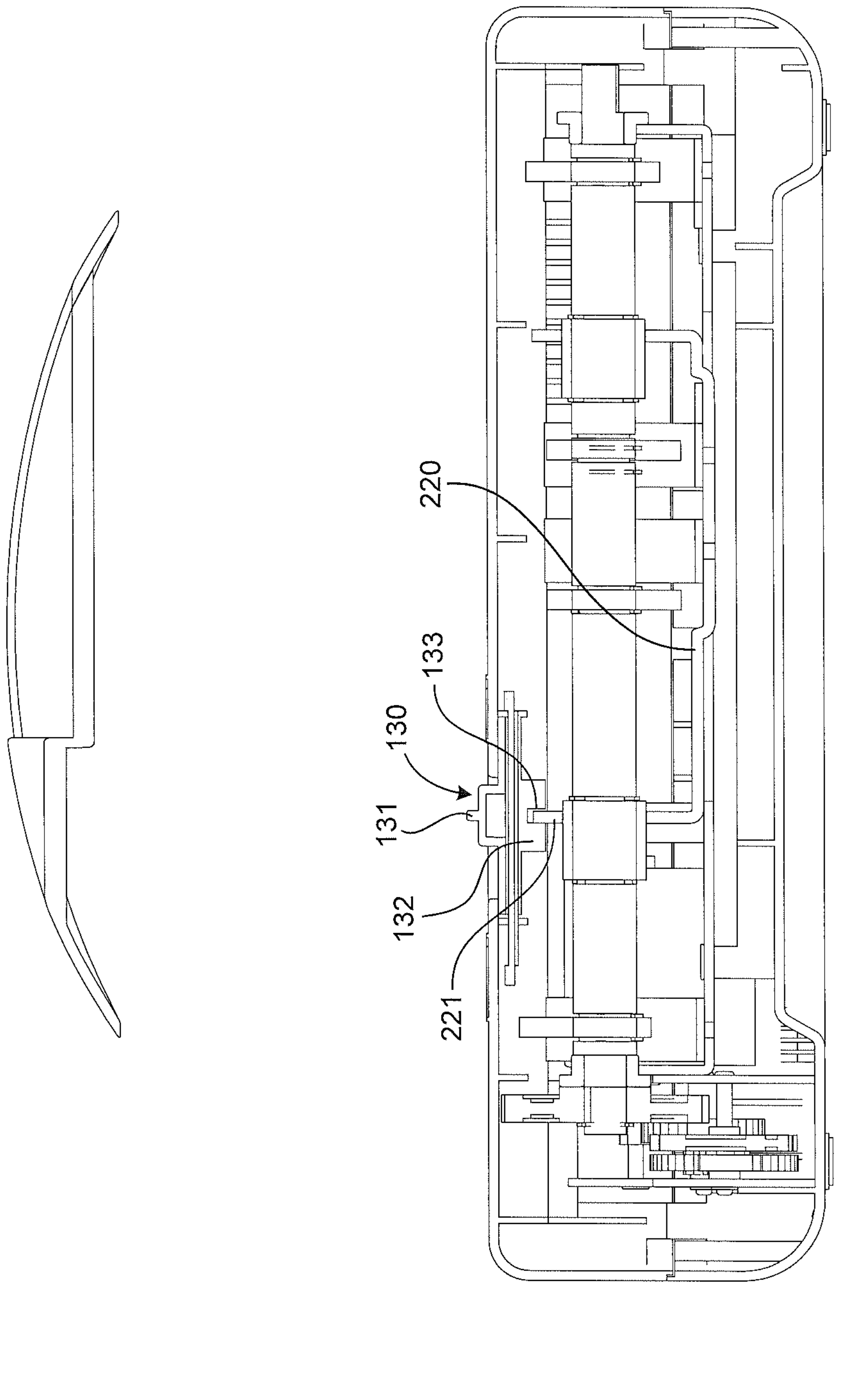
FIG. 7 is a side cross-sectional view along line 7-7 as shown in FIG. 1.
Figure 8:
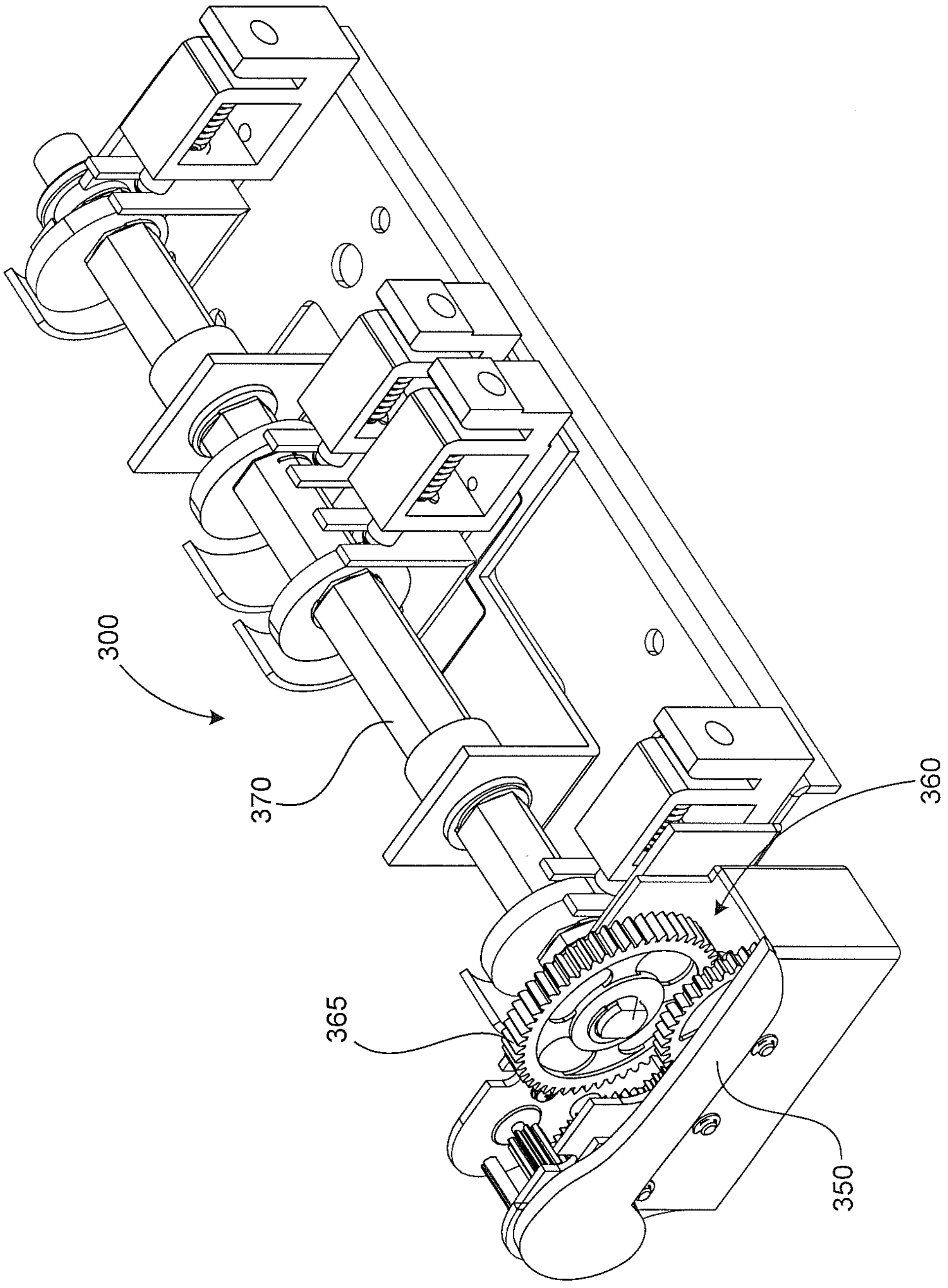
FIG. 8 is a perspective view of a hole punch in accordance with another embodiment of the invention, shown in a three-hole configuration.

As shown in FIG. 7, the selector 130 may have a coupling flange 132 on a side opposite the selector protrusion 131. The coupling flange 132 may include a channel 133 having open ends and a width such that a thickness of the flange 221 of the plate 220 may fit within the channel. In this manner, the plate 220 may slide in response to a sliding movement of the selector 130. In preferred arrangements, the flange 221 may fit within the channel 133 such that there is little or no gap therebetween. In this manner, lateral movement of the selector 130 causes a substantially equidistant lateral movement of the plate 220.

With respect to the embodiments described herein, although not intending to be limiting, when using the punch 100, the longitudinal edge of an 8.5 inch by 11 inch sheet of paper may be inserted into the punch 100 with the shorter edge of the sheet rested against the notch 121. In this manner, when the selector protrusion 131 of the selector 130 is positioned adjacent the label 118, three holes may be punched near the longitudinal edge that is inserted into the punch 100 at a distance from the longitudinal edge that is equivalent to the distance from the resting surfaces 214 to the corresponding punch rods 210 of the punch assemblies 191-194. The notch 121 may be positioned relative to the longitudinal slot 111 such that a middle of the three holes formed by the punching operation of the punch 100 is located at a position along an imaginary centerline through the longitudinal edge and the two outer holes are in positions equidistant from this imaginary centerline.

Likewise, the short edge of an 8.5 inch by 11 inch sheet of paper may be inserted into the punch 100 with the longitudinal edge of the sheet rested against the notch 122. In this manner, when the selector protrusion 131 of the selector 130 is positioned adjacent the label 119, two holes may be punched near the short edge inserted into the punch 100 a distance from the short edge equivalent to the distance from the resting surfaces 214 to the corresponding punch rods 210 of the punch assemblies 191-194. The notch 122 may be positioned relative to the longitudinal slot 111 such that the two holes that are punched in this two-hole configuration are in positions equidistant from the imaginary centerline passing through the short edge of the inserted sheet of paper.

In an alternative embodiment, a manually-powered device 300 may have substantially the same features as the punch 100 except that the punch 300 may include a lever 350 in place of the motor. In this manner, the lever 350 may be rotatable about an end thereof attached to a power transmission system 360 such that it drives the transmission system. The transmission system 360 in turn may be connected to a shaft, which may be substantially similar to the shaft 170, such that an angular displacement of the lever causes a corresponding angular displacement of the shaft 370 to cause punching through an interface between cams and punch rods, such as those described previously herein. In some arrangements, the power transmission system 360 may include a gear or set of gears that may be driven by the force of the lever. In further arrangements, the lever may be attached directly to the shaft 370 such that an angular displacement of the lever causes a substantially equal angular displacement of the shaft 370. These arrangements may still provide switching between three-hole and two-hole punch configurations in at least the manner described previously herein.

In another alternative embodiment, a punch may include only one inner punch assembly between two outer punch assemblies. In such a configuration, the inner punch assembly may have substantially the same features as the separate punch assemblies 192, 193 previously described herein, including being adapted to be fixed to a moveable plate, except that a single punch die may hold two punch rods and two resilient elements and may have two axial bores through which the punch rods may translate and a single die slot for receiving sheets of paper.

In yet another alternative embodiment, a punch may again include only one inner punch assembly between two outer punch assemblies. In such a configuration, the inner punch assembly may have substantially the same features as either of the inner punch assemblies 192, 193 including only a single punch rod. In addition, an inner punch assembly in accordance with such an embodiment may be fixed to a moveable plate as in the embodiments previously described herein. In contrast to such embodiments, however, an inner punch assembly in accordance with this embodiment may have a relatively longer key slot to allow a greater distance of travel of the plate relative to the mount for a given spacing between cams used for three-hole and two-hole punch configurations, respectively, that correspond to the inner punch assembly. The greater amount of travel may be necessary when using only one inner punch assembly having only a single punch rod because when switching between three-hole and two-hole punch configurations, the punch rod must move the entire distance between the cams corresponding to the inner punch assembly.

In still another alternative embodiment, a stop may be fixed to the shaft at a position along the shaft such that either of the plate flanges, such as those described previously herein, may contact the stop to provide a positive stop. Such a stop may be a ring around the shaft having a perimeter larger than the bore of the corresponding plate flange that slides over the shaft during axial movement of the plate. A stop in accordance with this embodiment may be used in conjunction with one or both fasteners extending through the key slot, such as the fasteners 261, 262 previously described herein, acting as stops or may be used alone. Moreover, stops fixed to the shaft may be provided on opposite ends of the shaft surrounding inner cams such that the stops fixed to the shaft provide stops in both directions of movement of the plate, i.e., when switching between three-hole and two-hole punch configurations.

In still other alternative embodiments, additional cams or as few as two cams may be coupled to the shaft 170. In such embodiments, additional or fewer punch assemblies corresponding to the additional cams may be provided. The corresponding additional cams and punch assemblies may work in conjunction to punch additional holes. Moreover, in some arrangements in accordance with these embodiments, multiple selectors may be provided in which each of the selectors may be coupled to a separate sliding plate to permit adjustment between a variety of hole punch configurations.

In still further alternative embodiments, a manually-powered device may have substantially the same features as the punch 100 except that the punch may include a lever in place of the motor. In this manner, the lever may be rotatable about an end thereof attached to a gear of a gear system, such as the gear system 160, such that it drives the gear system. In some arrangements, the lever may be attached directly to the shaft such that an angular displacement of the lever causes a substantially equal angular displacement of the shaft to cause punching through an interface between cams and punch rods. Such embodiments may still provide switching between three-hole and two-hole punch configurations in at least the manner described previously herein.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for punching holes comprising:

a base movable from a first position to a second position;

at least first and second punch assemblies attached to the base so as to move together with the base, each of the first and second punch assemblies including a punch movable relative to the base and having an end, the respective punches being parallel; and at least first and second cams fixed to a rotatable shaft, each of the first and second cams having an engagement portion for engagement with the ends of the respective first and second punches at a predetermined rotation position of the rotatable shaft, wherein, when the base is in the first position, rotation of the rotatable shaft to the predetermined rotation position causes movement of only one punch of the first and second punch assemblies relative to the base, and wherein, when the base is in the second position, rotation of the rotatable shaft to the predetermined rotation position causes movement of only the other punch of the first and second punch assemblies.

2. The apparatus of claim 1, further comprising a selectively positionable selector for contacting the base, wherein when the selector is in contact with the base, the base moves from the first position to the second position.

3. The apparatus of claim 2, the selector having at least two flanges extending therefrom, the at least two flanges being spaced a distance from each other to define a space, and the base having a top flange extending therefrom, wherein the top flange is inserted into the space defined by the selector flanges for contact between the base and the selector flanges.

4. The apparatus of claim 3, wherein the thickness of the top flange is substantially the distance the at least two flanges of the selector are spaced from each other such that movement of the selector causes the base to move.

5. The apparatus of claim 1, further comprising:

third and fourth punch assemblies fixed to a fixed mount, each of the third and fourth punch assemblies further including a punch having an end, each of the respective punches being parallel to the other punches and slideable relative to the mount; and third and fourth cams fixed to the rotatable shaft, each of the third and fourth cams having an engagement portion for engagement with the ends of the respective third and fourth parallel punches at the predetermined rotation position of the rotatable shaft, wherein the first and second cams are between the third cam and the fourth cam.

6. The apparatus of claim 1, further comprising an electric motor adapted to drive a rotation of the rotatable shaft.

7. The apparatus of claim 6, further comprising a switch in electrical communication with the electric motor having a connected position in which the electric motor drives the rotation of the rotatable shaft and a disconnected position in which the electric motor does not operate.

8. The apparatus of claim 1, further comprising a lever adapted to drive a rotation of the rotatable shaft.

9. The apparatus of claim 1, the punch assembly further comprising at least one die having a slot through a thickness thereof, and at least one resilient element engaged with at least one of the punches, wherein the resilient element biases the at least one punch to a first position such that the at least one punch is external to the slot, and wherein rotation of the shaft causes the punch to move such that at least a portion of the punch is within the slot.

10. The apparatus of claim 1, further comprising a means for stopping the movement of the base at at least one of the first and second positions.

11. The apparatus of claim 1, the base including a top flange extending therefrom and the apparatus further comprising at least one shaft stop extending from the rotatable shaft, wherein the base top flange is in contact with the at least one shaft stop when the base is in the first position.

12. The apparatus of claim 1, further comprising a mount including a longitudinal slot having an end, wherein the base has a flange extending therefrom, and wherein the base flange is in contact with the end of the slot when the base is in one of the first and second positions.

13. The apparatus of claim 1 further comprising:

a first die having a bore through which the first punch moves relative to the base; and a second die having a bore through which the second punch moves relative to the base.

14. The apparatus of claim 1 further comprising a die having first and second bores, wherein the first punch moves through the first bore when the first punch moves relative to the base, and wherein the second punch moves through the second bore when the second punch moves relative to the base.

15. An apparatus for punching holes comprising:

a base movable from a first position to a second position;

a punch attached to the base so as to move together with the base, the punch further being movable relative to the base and having an end;

at least first and second cams fixed to a rotatable shaft, each of the first and second cams having an engagement portion for engagement with the end of the punch at a predetermined rotation position of the rotatable shaft, wherein, when the base is in the first position, rotation of the rotatable shaft to the predetermined rotation position causes the engagement portion of only one cam of the first and second cams to engage with the end of the punch so as to move the punch relative to the base, and wherein, when the base is in the second position, rotation of the rotatable shaft to the predetermined rotation position causes the engagement portion of only the other of the first and second cams to engage with the end of the punch so as to move the punch relative to the base.

16. The apparatus of claim 15, further comprising an electric motor adapted to drive a rotation of the rotatable shaft.

17. The apparatus of claim 15, further comprising a lever adapted to drive a rotation of the rotatable shaft.

* * * * *